Figures 7, 8:
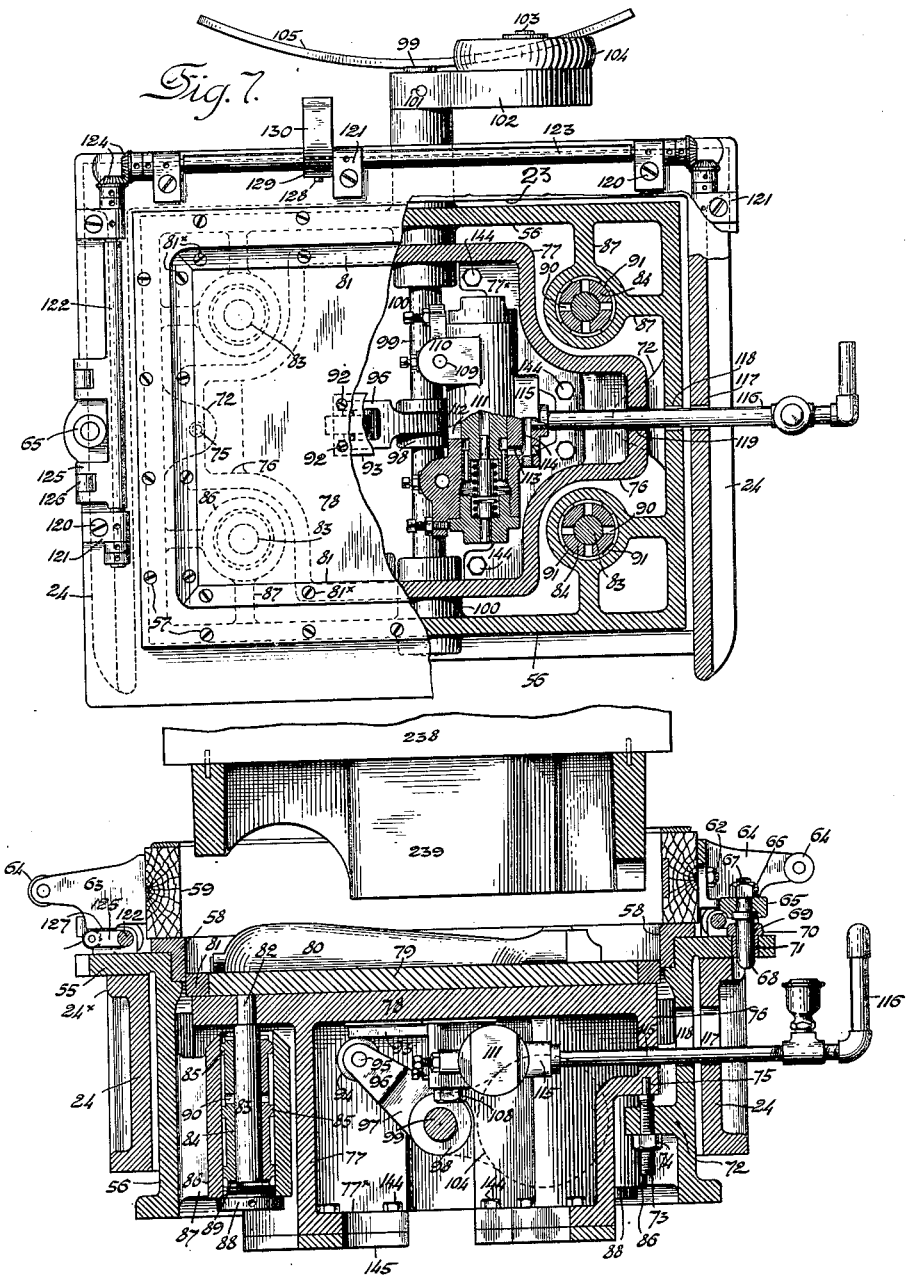

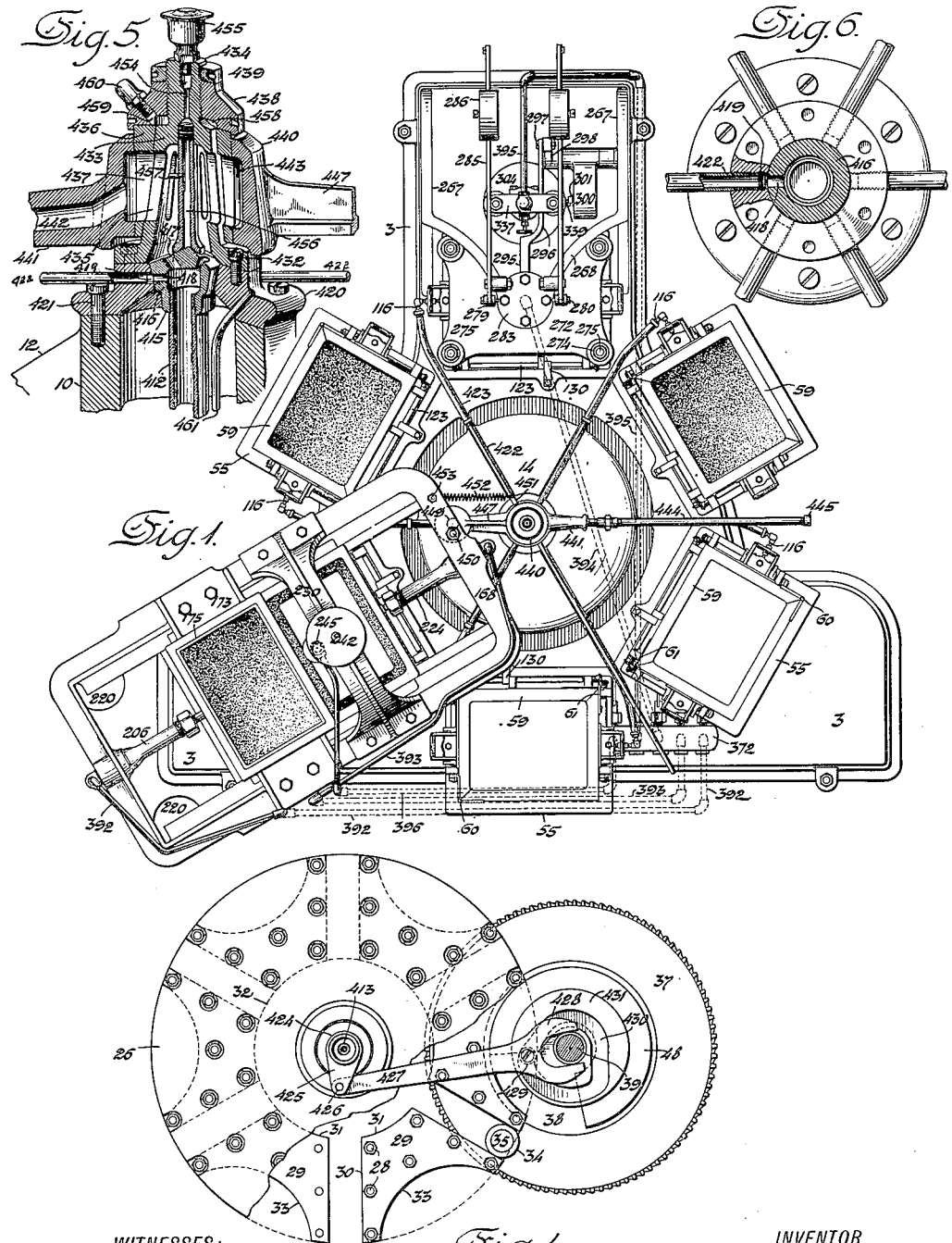

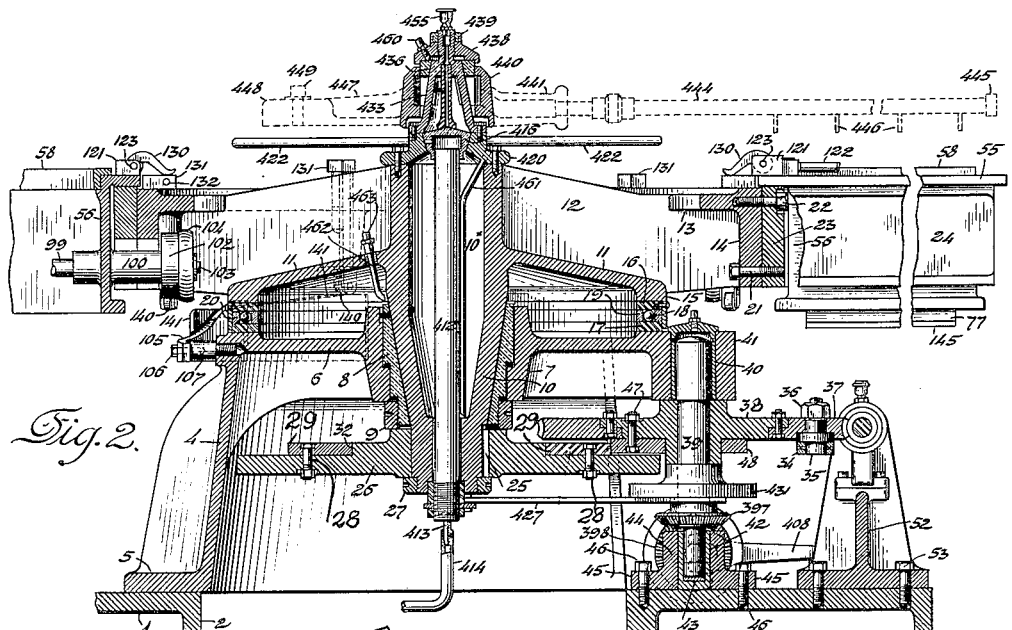
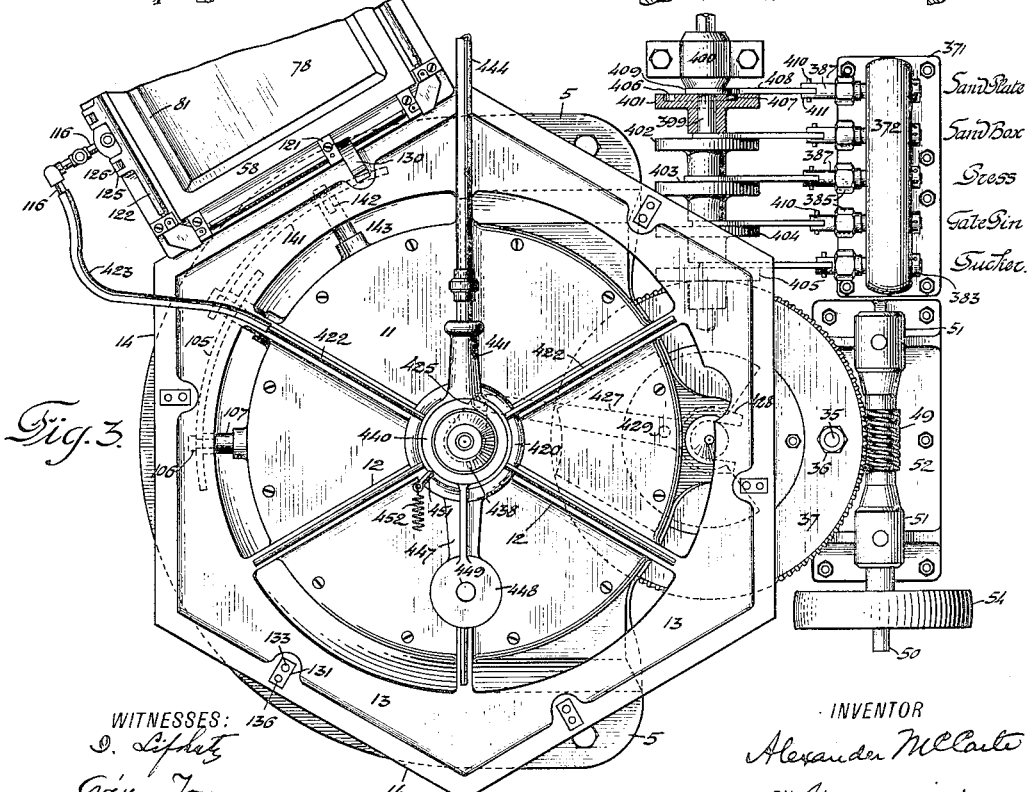

A. McCARTE.
MOLDING MACHINE.
APPLICATION FILED JAN. 12, 1911.

1,134,396.

Patented Apr. 6, 1915.
7 SHEETS—SHEET 4.

WITNESSES:
J. Lefshutz
Géza Ferna

INVENTOR
Alexander McCarte
BY Henry J. Miller
ATTORNEY

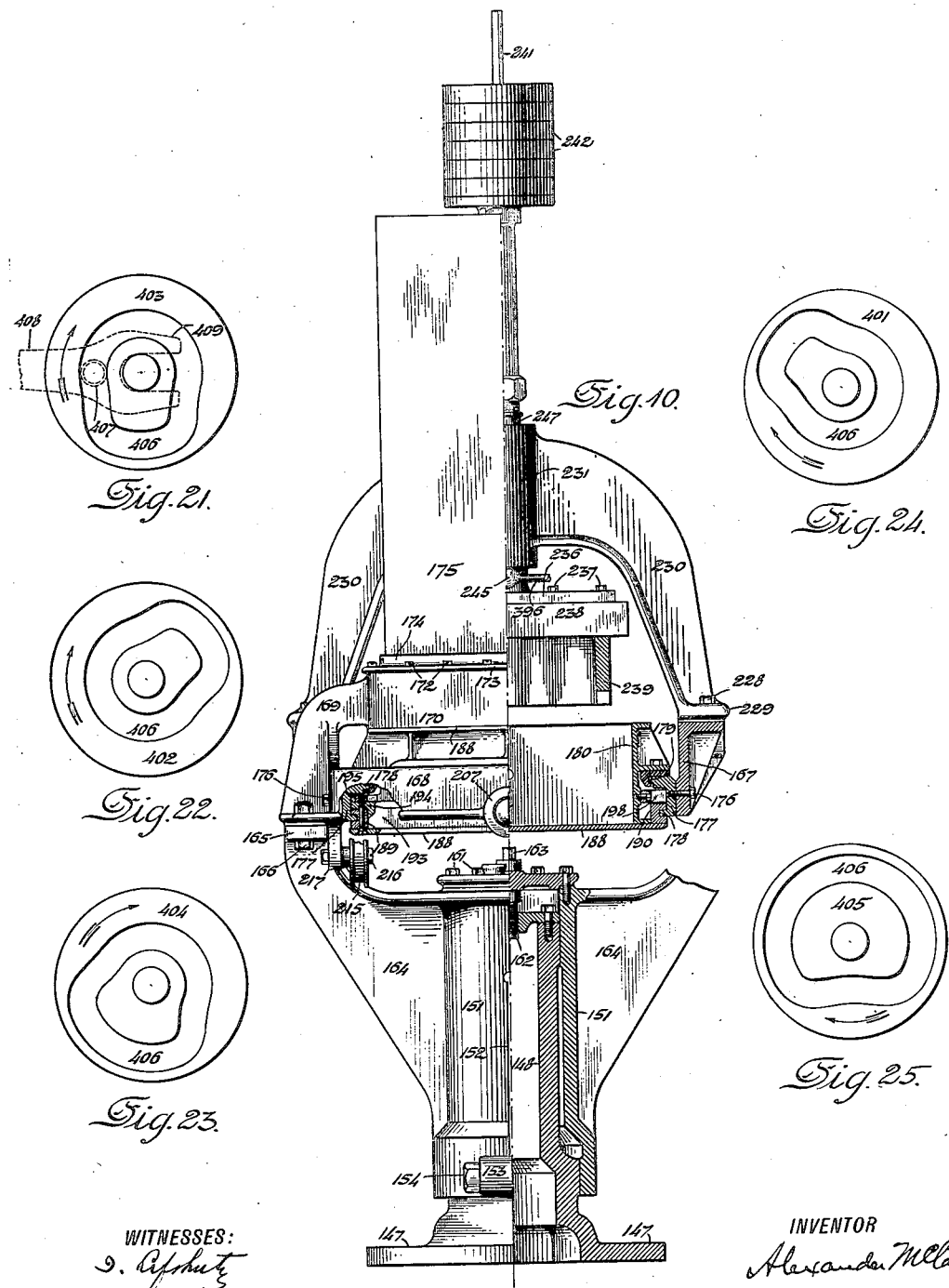

A. McCARTE.
MOLDING MACHINE.
APPLICATION FILED JAN. 12, 1911.
1,134,396.
Patented Apr. 6, 1915.
7 SHEETS—SHEET 6.
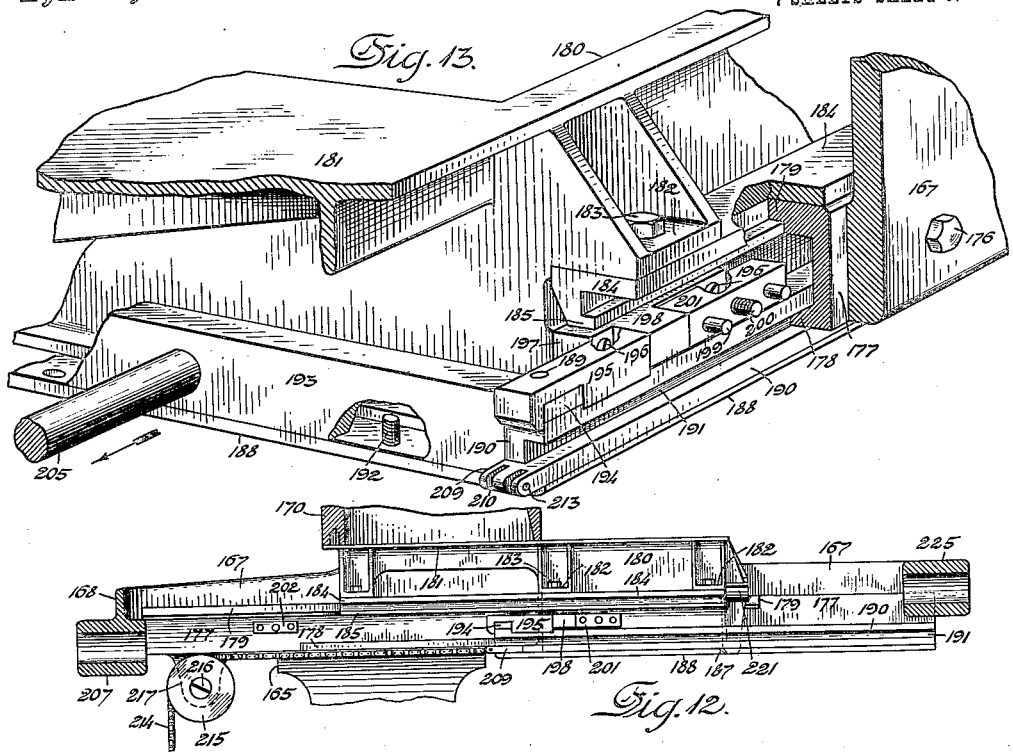
Fig. 13.
Fig. 12.
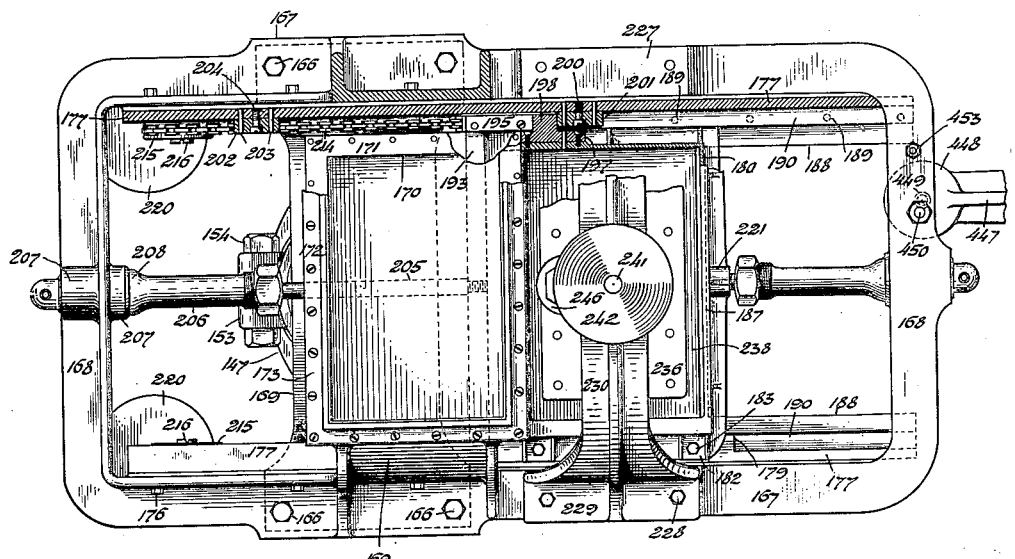
Fig. 11.
WITNESSES:
J. Lifschitz
Géza Verna
INVENTOR
Alexander McCarte
BY Henry J. Miller
ATTORNEY

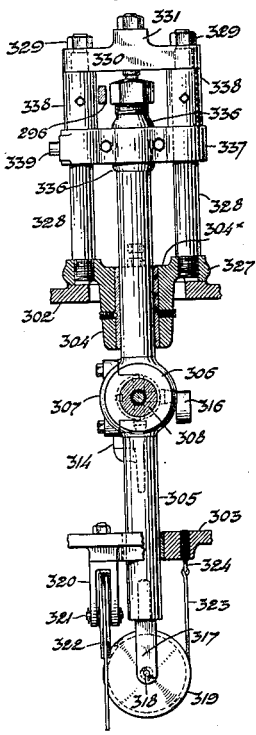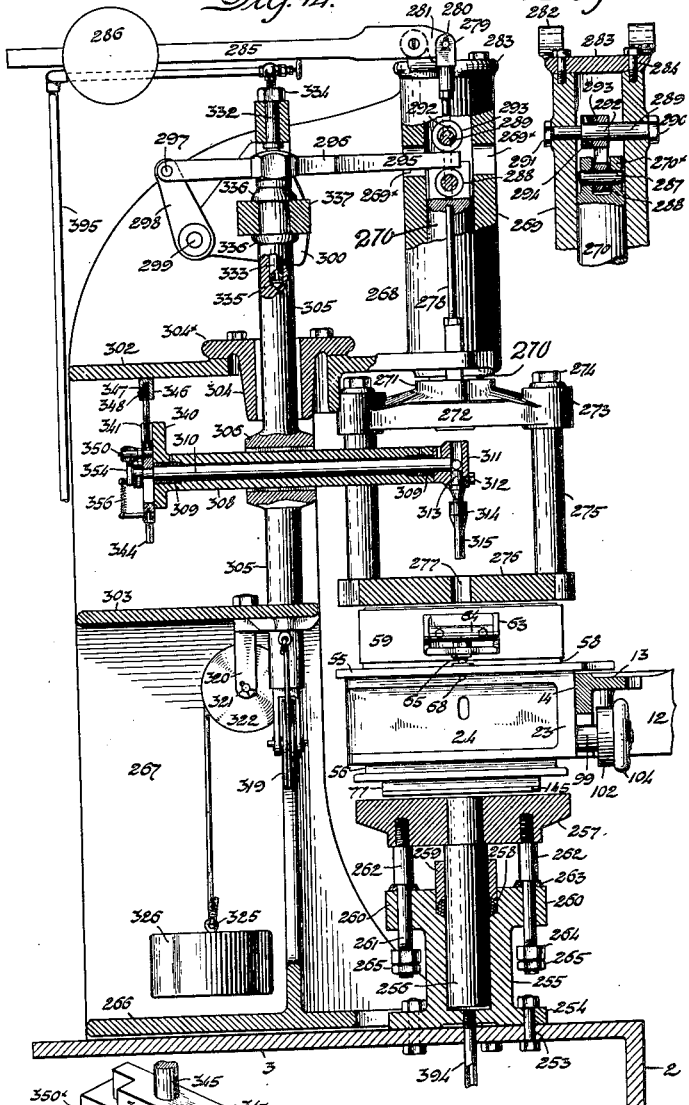

UNITED STATES PATENT OFFICE.

ALEXANDER McCARTE, OF NEWARK, NEW JERSEY, ASSIGNOR TO THE SINGER MANUFACTURING COMPANY, A CORPORATION OF NEW JERSEY.

MOLDING-MACHINE.

1,134,396.  Specification of Letters Patent.  Patented Apr. 6, 1915.

Application filed January 12, 1911. Serial No. 602,354.

*To all whom it may concern:*

Be it known that I, ALEXANDER McCARTE, a citizen of the United States, residing at Newark, in the county of Essex and State of New Jersey, have invented certain new and useful Improvements in Molding-Machines, of which the following is a specification, reference being had therein to the accompanying drawings.

This invention has for its object to provide an effective and conveniently controlled and operated apparatus for automatically producing sand molds.

The present invention is embodied in apparatus comprising a traveling flask-support with means for imparting to it operative movements with periods of rest whereby the movement of a flask supported thereon is interrupted at a plurality of stations on in each excursion of the support from initial position, with successively acting flask-filling, tucking and striking-off means disposed at one of said stations and mold-compressing means disposed at another of said stations.

In the preferred embodiment of the improvement, the means for sustaining the flasks consists of a rotary turret of polygonal form having secured to each side a carrier for the flask which supports also a pattern-carrier movable relatively thereto. Mounted upon a frame adjacent and overhanging the path of movement of the flasks at one of their stations of rest is a sand-hopper having an open bottom beneath which is sustained in normal register therewith a reciprocating sand-box movable upon ways arranged in radial relation with the turret and adapted to carry a charge of sand from the lower end of the hopper over each flask into which it is delivered by retraction of the bottom of the sand-box. While the sand-box remains in such position, a tucker descends through the same into the flask to pack the sand around the pattern after the retraction of which the return of the sand-box to initial position serves to strike off the superfluous sand above the mold and at the same time to fill up the cavities formed therein by the tucker. The flask is then carried to another station by the subsequent rotation of the turret, as more fully described in my application Serial No. 677,331, filed February 13, 1912, and thereby brought into register with the mold-compressing ram and the gate-pin. As the gate-pin descends into the mold through an aperture in the thrust-platen above the flask, the thrust-platen is lowered slightly to close the clearance space between the same and the top of the flask, after which the press-ram rises to force the pattern-carrier and pattern upwardly into the bottom of the flask to compress the sand in the latter and form the mold, after which the press-ram is retracted and the pattern-carrier gradually lowered, and the gate-pin and thrust-platen retracted to initial position above the flask. The flask containing the finished mold is removed at a succeeding station.

The invention will be more fully understood by reference to the accompanying drawings, in which—

Figure 19:
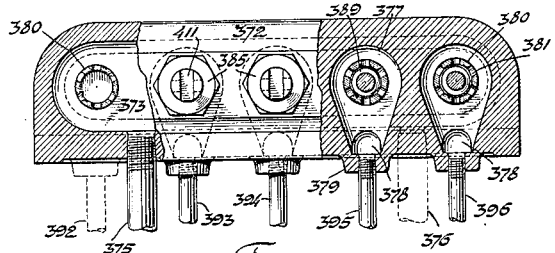
Figure 26:
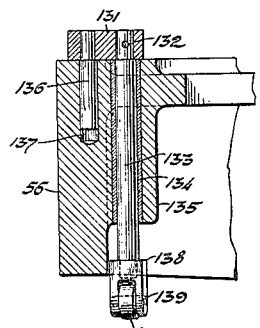
Figure 9:
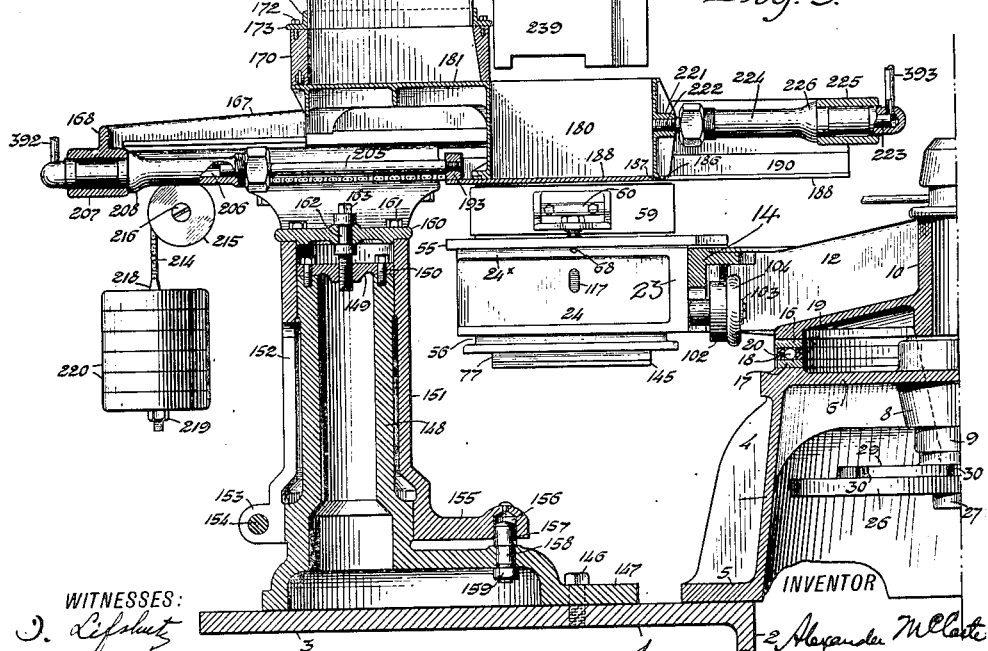

Figure 1 is a plan of the apparatus upon a small scale. Fig. 2 is a sectional elevation and Fig. 3 a plan of the turret with its actuating means and the controlling means for the several hydraulic rams employed in the apparatus. Fig. 4 is a view of the bottom side of the turret-actuating means. Fig. 5 is a sectional perspective view of certain air valves at the top of the hollow hub of the turret, and Fig. 6 a plan, partly in section, of the same. Fig. 7 is a plan view partly in section, and Fig. 8 a sectional elevation of one of the flask-carriers and parts sustained thereby. Fig. 9 is a sectional side view of the mold-filling and tucking device; Fig. 10 an end view of the same partially in section; Fig. 11 a plan of the same parts, in partial section; Fig. 12 a side elevation, also partly in section, of the sand-box and its runway; and Fig. 13 a perspective view upon a much larger scale of a portion of the sand-box with its runway and portions of its actuating means. Fig. 14 is a sectional side view of the mold-compressing and gate-forming means, and Fig. 15 a sectional elevation representing in part the means for actuating the thrust-platen. Fig. 16 is a detached end view, partly in section, of the gate-pin actuating means, and Fig. 17 is a face view and Fig. 18 an enlarged perspective view of the gate-pins are presented alternately to the aperture in the thrust-platen. Fig. 19 is a side view, partly in section upon two different planes, of the hydraulic valve casing and valves, and Fig. 20 a transverse section of the same with one of the valves and its seat partly in section. Figs. 21 to 25 are face views, upon an enlarged scale, of the valve-actuating cams. Fig. 26 is a detail sectional view of one of the flask-carriers and a portion of a flask-lifting device carried thereby.

The entire apparatus is mounted upon a bed-plate having a central or body portion 1 provided with a well 2, over which the hub of the turret is arranged and formed with lateral extensions 3 in triangular arrangement for supporting other parts of the apparatus.

The turret is sustained by the arched base member 4 having the bottom flange 5 secured upon the bed-plate 1 and having the top surmounted by a circular plate 6 with the central internally-stepped boss 7 to which is fitted the externally-stepped bushing 8 having an externally threaded lower end to which is fitted the threaded thrust-collar 9 by means of which the bushing is drawn downwardly to firmly seat its slightly taper external faces upon those of the boss 7.

The bore of the bushing 8 is upwardly flared to receive the taper external surface of the hollow hub 10 of the turret which has formed integral therewith the disk 11 and the radial ribs or arms 12 carrying the outer ring 13 somewhat above the disk 11 formed with depending flanges 14 in hexagonal arrangement. The disk 11 has a depending rim 15 having a facing ring 16 between which and a similar facing ring 17 upon the top plate 6 of the base 4 is a series of anti-friction balls 18 confined against lateral displacement by means of the inner and outer rings 19 and 20. To each of the depending flanges 14 is secured by means of the clamp-bolts 21 and 22 the side member 23 of a yoke having parallel end members 24 extending in substantially radial relation with the turret and affording a sustaining member for one of the flask-carriers.

To the cylindrical lower end portion of the turret-hub is secured against turning by means of the key 25 the hub of a disk 26 which is sustained firmly seated against the collar 9 by means of the internally threaded collar 27 applied to the reduced and threaded extremity of the hub 10.

Upon the top of the disk 26 are secured by means of bolts 28 a series of cam-plates 29 having convergent straight edges 30 in substantially radial relation with the turret-hub, concaved inner edge 31 resting against an annular shoulder 32 of the disk 26. Each cam plate is formed with the concaved outer edge 33. The straight edges 30 of the adjacent cam-plates 29 are spaced apart to form radial guideways adapted to be entered successively by a roller 34 journaled upon the depending lower end of a shouldered stub-bolt 35 secured by means of the nut 36 in an aperture in the peripherally toothed outer portion 37 of a sectional worm-wheel whose inner or hub portion 38 is fixed upon the vertical shaft 39 having the upper end journaled within the bushing 40 of a bearing boss 41 extending laterally from the turret-sustaining base-member 4, and whose lower end is journaled in a step bearing afforded by the bushing 42 having in its closed lower end the wearing piece 43 and fitted within the bearing boss 44 having its foot-piece 45 secured by means of screw-bolts 46 upon the bed 1.

To the lower face of the inner worm-wheel section 38 is secured by means of the bolts 47 the segmental cam-disk 48 having a radius of curvature the same as that of the concaved outer edges 33 of the cam-plates 29 and arranged in a position diametrically opposite the stud-bolt 35. The peripheral teeth of the worm-wheel section 37 mesh with a worm 49 fixed upon the driving shaft 50 which is journaled in bearing bosses 51 of a bracket 52 secured by means of screw-bolts 53 upon the bed 1, said shaft carrying the belt-driven pulley 54 by means of which the shaft 50 is driven to impart to the worm-wheel through the worm 49 a continuous rotary motion.

As will be observed, in the position of the parts represented in dotted lines in Fig. 3, the cam-disk 48 fits within the concaved outer edge of one of the cam-plates 29 and thus securely locks the disk 26 of the turret against circular movement. As the worm-wheel continues to rotate, the roller 34 is caused to enter the guideway between the adjacent edges of two of the cam-plates 29 at the point when one extremity of the cam-disk 48 is in radial relation with both the turret-hub 10 and the shaft 39, as represented in Fig. 4. The continued movement of the worm-wheel carries the roller 34 through a circular arc embracing a portion of the disk 26 and thereby causes the movement of the latter through an angle of, in the present instance, 60°, during which the concavity 33 of the cam-plate 29 recedes from the adjacent edge of the cam-disk 48 to permit the free movement of the disk 26, while the opposite extremity or angle of the cam-disk 48 approaches one extremity of the concavity 33 of the succeeding cam-plate 29 which it engages just as the roller 34 emerges from its guideway between the cam-plates. The engagement of the cam-disk 48 with the succeeding cam-plate 29 causes the relocking of the disk, and hence of the turret, against circular movement for another period during which the roller 34 moves around the shaft 39 for entrance into a succeeding guideway between the cam-plates.

By the means just described, the turret or flask-support is given an intermittent rotary motion with periods of rest whereby the movement of the flasks supported thereby is interrupted at a plurality of stations corresponding with the number of flasks in each rotation or excursion of the turret from an initial position to its return to the same position, and the means for operating upon the sand in forming the mold are spaced apart at successive stations of the turret where the flasks are locked during certain of their periods of rest.

Each of the parallel yoke members 24 is formed at the top with a lateral flange 24ˣ whose upper face affords a seat for a lateral flange 55 extending outwardly from the top of an open-bottomed rectangular box or casing 56 constituting the flask-carrier and having applied to its upper and inner faces and secured thereto by means of screws 57 the wearing frame 58 of inverted L-shaped cross section. The upper face of the wearing frame 58 affords a seat upon which rests the open bottom of the snap-flask 59 which is shown herein divided at diagonally opposite corners to one of which is applied the hinge 60 (Fig. 1) and to the other of which is applied a latch device 61 of any well-known or suitable construction.

Secured to opposite sides of the flask by means of bolts 62 are handle brackets 63 having the handle pieces 64, the brackets being provided with laterally extending bosses 65 in which are secured by means of clamp-nuts 66 applied to their threaded ends the shouldered bolts 67 having depending steady-pins 68 entering suitable eyes 69 in bushings 70 within apertures 71 formed in the lateral flanges 55 of the flask-carrier.

As the embodiment of the present improvement shown and described herein is designed for producing two-part molds requiring alternate operation upon the cope or upper flask-section and the drag or lower flask-section, respectively, the steady-pin 68 and the eye for receiving it are in practice inversely arranged in the different flask sections for interengagement when the sections are brought together to form the complete mold, and the lateral flanges 55 of the successive flask-carriers are correspondingly arranged for maintenance of the flask-sections against displacement in the mold-forming operations.

The flask-support 56 is provided upon the opposite faces of its inner wall with inwardly extending lugs 72 having threaded apertures to which are fitted the bearing screws 73 having jam-nuts 74 and upon whose upper ends rest the heads of bearing pins 75 carried by lateral extension 76 of a hollow box 77 constituting the pattern-support whose closed upper end 78 affords a flat seat for the pattern-plate 79 to which the pattern section 80 is secured. Upon the margin of the pattern-supporting plate 78 is secured by means of screws 81ˣ the rectangular wear-plate 81 whose outer faces are fitted loosely to the adjacent faces of the wear-frame inclosing the same, and to whose inner faces the adjacent edges of the pattern-plate 79 are fitted.

The pattern-supporting plate 78 has formed therein at a point near each of its four corners an aperture in which is secured the reduced upper end 82 of a depending plunger-rod 83 fitted within a bushing 84 formed with annular bearing ribs 85 which are themselves fitted within a tubular bearing boss 86 rigidly connected with the adjacent walls of the box or casing 56 by means of the wings 87 cast integrally therewith. The lower end of the boss 86 is closed by means of a screw-plug 88, but it is open at the upper end, and the bushing 84 is formed at the lower end and intermediate the ends with transverse apertures 89 and 90 to establish communication between the interior and exterior of the bushing, and the annular ribs 85 are interrupted at several points around the circumference to form shallow channels 91 to establish communication between the upper and lower ends of the bearing boss 86. The bushings 84 not only afford guides for the plungers 83 to properly direct the pattern-carrier in its vertical movements, but, the otherwise vacant space within the bearing boss 86 being filled with heavy oil or other liquid, they serve as dash-pots to insure the slow descent of the pattern-carrier after an upward mold-compressing movement, so as to insure the reengagement of the bearing pin heads 75 with the points of the stop-screws 73 without shock.

To the lower face of the pattern-supporting plate 78 is secured by means of screws 92 the wearing plate 93 against the lower operative face of which rests the roller 94 mounted upon a transverse pin 95 in the forked outer end 96 of a crank-arm 97 whose hub 98 is fixed upon the rock-shaft 99 mounted in transversely arranged bearing bosses 100 of the flask-supporting casing 56. The rock-shaft 99 has fixed upon its outer end by means of the pin 101 one end of a lateral crank-arm 102 whose outer end carries a headed journal-pin 103 upon which is mounted the weighted roller 104. When the pattern-carrier moves upwardly under the action of the mold-compressing ram from the initial position represented in Figs. 7 and 8, for a mold-compressing operation, the weight of the roller 104 turns the rock-shaft 99 to bring the roller 94 directly above said rock-shaft so as to detain the pattern-support in its advance position with the upper faces of the wear-plate 81 and pattern-plate 79 flush with the top of the wear-frame 58 and the bottom of the flask 59. The pattern-carrier is maintained in this elevated position until the turret performs its next partial rotation, when the weighted roller 104 encounters the upwardly inclined operative edge of a stationary cam-plate 105 secured by means of stud-bolts 106 and spacing bushings 107 to the rim of the plate 6 of the turret-sustaining base-member, by means of which the arm 102 is gradually raised to turn the rock-shaft 99 and thereby swing the crank-arm 97 laterally to cause the detaining roller 94 to assume its lower position, thereby permitting the pattern-support to descend by gravity to initial position.

As before indicated, the pattern 80 is rigidly secured to the pattern plate 79 resting upon the supporting plate 78 of the carrier 77 and confined against lateral movement thereon by contact with the adjacent walls of the wear-plate 81. To facilitate the disengagement of the pattern from the finished mold without injury of the same during the retraction of the pattern-support, the plate 78 has rigidly secured to its lower side a pneumatically actuated vibrator or jarring device by means of bolts 108 entering apertures 109 in lugs 110 of the cylinder 111. The vibrator-cylinder has fitted within the same a reciprocating plunger of well-known construction and is provided in one side with the exhaust post 112 and in the opposite side with two spaced inlet ports 113 connected by a channel 114 in the projecting boss 115, the inlet channel being connected with the air-supply pipe 116 entering slots 117 and 118 formed to receive the same in the yoke member 24 and flask-support 56, and passing through an aperture 119 in the side wall of the pattern-support. The admission of air to the vibrator-cylinder through the supply-pipe 116 during and subsequent to the mold-compressing operation produces sufficient jarring of the parts to prevent adherence of particles of sand to the pattern when the latter is lowered from the interior of the flask section.

The flange 55 of the flask-support has secured upon its upper face on three sides thereof by means of screws 120 the bearing blocks 121 in which are journaled the parallel rock-shafts 122 and the intermediate rock-shaft 123 connected together by means of the intermeshing bevel pinions 124. Each of the rock-shafts 122 is provided with a pair of forked outwardly projecting arms 125 extending upon opposite sides of the boss 65 and each carrying a roller 126 lying intermediate the flask-support flange 55 and a flat seat 127 of the handle-bracket 63.

Fixed upon the intermediate rock-shaft 123 by means of the set-screw 128 is the hub 129 of a tappet-arm 130 whose rounded outer end rests upon the top of a block 131 secured by means of a transverse pin 132 upon the reduced upper end of a rod 133 journaled in a bushing 134 of the vertical bearing boss 135 formed upon the inner wall of the flask-supporting casing 56. The block 131 is provided with a depending steady-pin 136 entering a guiding aperture 137 formed in the member 56 parallel with said rod to prevent the turning of the latter while permitting the same to move freely endwise.

As represented in Fig. 26, the rod 133 has rigidly secured to its lower end the block 138 formed with a fork in which is journaled upon the transverse pin 139 the bearing roller 140 which is adapted to engage the operative inclined edge of the segmental stationary cam-plate 141, which, like the cam-plate 105, is secured to the turret-supporting base by means of stud-bolts 142 and spacing bushings 143. As represented in dotted lines in Fig. 3 the cam-plate 141 bears such relation to the cam-plate 105 that it acts upon the roller 140 after the completion of the pattern-jarring operation and just as the flask is about to arrive at the station succeeding that at which the mold-compressing operation has been performed, the lifting of the rod 133 causing, through the engagement of the block 131 with the tappet-arm 130, the rocking of the two shafts 122 and the lifting of their lateral arms 125 to engage the rollers 126 with the bearing plates 127 of the handle-pieces 63, whereby the flask is lifted slightly to facilitate the disengagement of the steady-pins 68 from the eyes 70 in the bushings 69, so that the flask section may be conveniently removed by the attendant.

The open lower end of the pattern-supporting box or casing 77 has an inwardly extending flange 77$^x$ to the bottom of which are secured by means of bolts 144 the facing plates 145 adapted to receive the head of the mold-compression ram.

One of the extensions 3 of the bed-plate has secured thereon by means of bolts 146 the foot 147 of a hollow cylindrical standard 148 surmounted by the cap-plate 149 secured thereon by the screws 150 and provided with a centrally threaded aperture. The standard is faced off in its upper and lower portions to afford bearings to which are fitted the corresponding portions of a split sleeve 151 having the longitudinal slit 152 and spaced lugs 153 adapted to be drawn together by means of the bolt 154 to insure a close fit of the sleeve upon the standard. The sleeve 151 is provided at the bottom with a lateral flange 155 having in its under side an aperture 156 entered by the enlarged head 157 of a steady-bolt 158 clamped within an aperture in the base 147 by means of the nut 159 whereby the sleeve is permitted to be raised and lowered upon the standard but is prevented from turning thereon. The sleeve 151 is provided at its upper end with a cap-plate 160 secured thereon by means of bolts 161 and provided with a central aperture in which is journaled the shouldered adjusting screw 162 whose threaded lower end enters the central aperture of the cap-plate 149 of the standard, and by turning the adjusting screw by application of a wrench to its squared head 163, the sleeve may be raised or lowered upon its fixed supporting standard. The said sleeve forms a member of a frame comprising the oppositely extending webs 164 extending upwardly and divergently above the top of the sleeve and terminating in spaced flanges 165 to which are secured by means of bolts 166 the parallel side members 167 of a substantially rectangular horizontal frame joined by means of the end members 168.

Rising from the side members 167 is an arched tie-beam 169 formed intermediate the side members with a rectangular curb 170 whose upper face affords a flat seat 171 upon which is secured by means of screws 172 the flange 173 of a collar 174 affording a socket in which is secured the lower end of the standing rectangular tube 175 constituting the body of the sand-hopper or magazine.

To the inner faces of the frame members 167 are secured by means of bolts 176 the longitudinally extending guide-rails 177 in the form of channel-beams and each having at the bottom and top the inwardly extending tongues 178 and 179, respectively.

The sand-box 180 is of rectangular shape and open at the top and bottom and corresponds substantially in length and width with the sand-hopper. At the rearward end and flush with its top it is provided with a cut-off plate 181 adapted to form a bottom for the sand-hopper when the sand-box is moved from beneath the same to supply a charge of sand to the flask. The sand-box and cut-off plate are formed in a single reciprocatory frame having lateral feet 182 to the lower faces of which are secured by bolts 183 the longitudinally channeled shoes 184 of angular cross-section whose body portions rest upon the tops of the rails 177 and whose outwardly projecting lower members 185 afford tongues extending beneath the tongues 179 of the guide-rails 177 to insure the proper guidance of the sand-box in its operative movements.

The forward wall of the sand-box has a depending forwardly extending flange 186 which is beveled downwardly and forwardly from the bottom of the inner face of the front wall to receive the similarly beveled knife-edge 187 at the forward end of the sand-plate 188 movable relatively to the sand-box but normally affording a bottom for retaining the sand therein. The sand-plate has secured thereon along its opposite edges by means of the screws 189 the laterally grooved shoes 190 whose grooves or channels 191 embrace the lower laterally extending tongues 178 of the guide-rails 177 by means of which the sand-plate is sustained and guided in its reciprocatory movements beneath and parallel with those of the sand-box. The rearward end of the sand-plate has secured upon its upper face by means of screws 192 the cross-beam 193 notched at each of its extremities to form a tongue 194 overlapping the shoe 190 and embraced by a transverse notch in the lower face of the thrust-block 195 secured upon the shoe 190 by means of certain of the screws 189.

To the side of the sand-box frame is secured by means of screws 196 a block 197 having a lateral extension 198 disposed in the path of movement of the thrust-block 195 and adapted for engagement by the same when the sand-plate is shifted into operative position above a flask to produce a corresponding advance movement of the sand-box frame. Within the channel of each of the guide-rails 177 is secured by means of dowel-pins 199 entering suitable apertures therein and the intermediate screw-bolt 200 a stop-block 201 which is so disposed within the range of travel of the extension 198 of the block 197 as to limit its forward movement when the sand-box is directly above and in register with one of the flask-sections at the filling station of the turret. A similar stop-block 202 is secured within the channel of the guide-rail 177 by means of the dowel-pins 203 and intermediate screw-bolt 204 to limit the return movement of the sand-plate by engagement with the rearward extremity of the thrust-block 195.

The cross-beam 193 is provided with a central threaded aperture entered by the similarly threaded reduced extremity of the plunger-rod 205 whose opposite end is fitted within a hydraulic cylinder 206 having its rearward end embraced by and sustained within the tubular boss 207 formed in the rearward cross-member 168 of the sand-hopper supporting frame, said cylinder being provided with an annular shoulder 208 normally resting against the forward extremity of the boss 207 which receives the thrust of the cylinder in the operation of the hydraulic ram thus constituted.

As shown more particularly in Figs. 11, 12 and 13, the lower member of each shoe 190 terminates at the rearward end in a lug 209 having the spaced parallel slots 210 in which are pivotally secured by means of a transverse pin 213 two of the link members of the sprocket-chain 214 led rearwardly over the peripherally grooved pulley 215 mounted upon the stud-screw 216 which is tapped into the depending lug 217 of the frame member 167, the chain being connected at its opposite end with a rod 218 having upon its lower threaded end the nut 219 supporting upon such rod 218 a series of weight-disks 220 sufficient for returning the sand-plate to initial position after an advance movement imparted thereto by the actuating hydraulic ram.

The front wall of the sand-box is provided externally with a boss 221 having a threaded aperture entered by the reduced threaded extremity 222 of the plunger-rod 223 whose opposite end portion is fitted within the hydraulic cylinder 224 having its forward end embraced by and sustained within the tubular boss 225 formed in the forward cross member 168 of the sand-hopper supporting frame, said cylinder being provided with an annular shoulder 226 normally resting against the rearward extremity of the boss 225 which receives the thrust of the cylinder in the operation of the hydraulic ram thus constituted.

In the operation of the sand-filling portion of the apparatus, the actuation of the ram-plunger 205 serves to advance the sand-plate, and with it the sand-box to extreme forward position directly above the flask section 59, the cut-off plate 181 replacing the sand-box to afford a bottom for the sand-hopper. The relief of the hydraulic pressure in the cylinder 206 thereafter permits the counter-balance weights 220 to act through the sprocket-chains 214 in retracting the sand-plate 188 and permits a portion of the contents of the sand-box to fall into the flask 59. The actuation of the ram-plunger 223 serves to return the sand-box to initial retracted position beneath the sand-hopper and at the same time to strike off from the top of the flask section the superfluous sand which is carried back upon the retracted sand-plate for employment in a succeeding flask-filling operation.

The side members 167 of the sand-box supporting frame are provided in advance of the cross-beam 169 with seats 227 to which are secured by means of bolts 228 the feet 229 of an arched tucker-sustaining frame 230 formed with a bearing boss 321 provided at opposite ends with bushings 232 to which is fitted the vertically movable bar 233 having its reduced lower end secured by means of the transverse pin 234 within a boss 235 of a circular plate 236 to the lower face of which is secured by means of screws 237 the head 238 of the tucker 239 conforming in general outline with the pattern 80. The bar 233 carries upon its shouldered upper end the head 240 above which projects the central pin 241 to which are applied the weight-disks 242 resting upon the head 240 and serving through the bar 233 to move the tucker 239 downwardly through the sand-box while in its advance position represented in Fig. 9, to pack the sand around the pattern. The cylindrical bar 233 has a longitudinal groove in one side entered by the key 243 by means of which it is locked from turning in the bearing boss 231.

Depending from one side of the head 240 is a plunger-rod 244 fitted to the bore of the hydraulic cylinder 245 arranged within a lateral socket 246 of the bearing boss 231 and having a shoulder 247 resting upon the exterior of the boss to sustain the downward thrust of the cylinder. A pressure is normally maintained in the hydraulic cylinder sufficient to act through the plunger 244 and the head 240 to maintain the tucker-bar 233 in retracted elevated position in opposition to the action of the weights 242. The relief of the pressure within the cylinder permits the weights to act with a predetermined force in forcing the tucker downwardly into the sand contained in the flask to distribute and pack the same around the pattern, and the reëstablishment of the normal pressure in the cylinder causes the elevation of the tucker to extreme upper position and maintains the same therein preparatory to the succeeding actuation.

The boss 231 is shown provided with a lateral lug 248 having a threaded aperture entered by the stop-bolt 249 whose head 250 is sustained in register with the head of a bearing screw 251 upon the lower face of the head 240 of the tucker-bar 233, by means of which the extreme lower position of the tucker is determined. The position of the bolt-head 250 may be obviously set at the desired height by suitably turning the bolt 249 which is retained in position by means of the jam-nut 252.

Another of the extensions 3 of the bed-plate has secured thereon by means of bolts 253 the flange 254 at the bottom of the hydraulic press-cylinder 255 within which is fitted the plunger 256 having secured upon its shouldered upper end the head or platen 257 having a flat upper face adapted to engage the facing plates 145 of the pattern-carrier 77 at the station of the turret next but one to that in which the flask-filling operation is performed. The cylinder is provided with the usual stuffing box within which the packing 258 is compressed around the plunger by means of the gland 259. The cylinder has at its upper end the oppositely extending perforated lugs 260 to whose apertures are fitted the reduced portions of stud-bolts 261 having enlarged upper portions 262 tapped into and depending from the platen 257, the enlarged portions of the bolts affording shoulders normally resting upon the washers 263 interposed between the same and the lugs 260, the threaded lower ends of the stud-bolts 261 are provided with the stop-nuts 264 adapted for engagement with the lower faces of the lugs 260 to limit the upward movement of the plunger, the stop-nuts being restrained against disarrangement by means of lock-nuts 265.

The bed-plate extension 3 last named has secured thereon adjacent the press-cylinder base the foot 266 of a frame comprising a standard 267 having at the upper end a lateral extension 268 provided with the vertical bearing boss 269 arranged in alinement with the press-plunger 256. To the interior of the bearing boss is fitted the cylindrical bar 270 upon whose lower end is fixed the hub 271 of a substantially rectangular plate 272 having at the corners the perforated bosses 273 in which are secured by means of bolts 274 the upper ends of the depending bars 275 having their opposite ends secured in the corners of the substantially rectangular thrust-platen 276 having the central gate-pin aperture 277. As represented in Figs. 1 and 14, the boss 271 of the plate 272 has secured therein the lower ends of the lengthwise adjustable rods 278 whose forked upper ends 279 are pivotally connected by means of the pins 280 with the shorter arms 281 of levers fulcrumed upon the bearing lugs 282 of the cap-plate 283 secured by means of bolts 284 upon the top of the bearing boss 269, the longer arms 285 of said levers each being provided with a counterbalance weight 286 longitudinally adjustable thereon and adapted to act through said levers 281 285 and rods 278 in drawing the thrust-platen 276 upwardly into retracted position above the flasks where it is normally maintained.

The bar 270 has in its upper ends the spaced perforated lugs 270× between which is sustained by means of the pin 287 the roller 288, and the bearing boss 269 is provided above the roller 288 with the transverse shouldered journal-pin 289 having the head 290 adjacent its larger portion and adapted to be clamped in position against turning by means of the nut 291 applied to the threaded extremity of its reduced opposite end portion. The journal-pin 289 is provided intermediate its ends and directly above the roller 288 with an eccentric portion 292 upon which is mounted the thrust-roller 293 confined against the shoulder presented by the larger portion of the pin by means of the collar 294. By turning the journal-pin 289 to shift the position of its eccentric bearing portion, the roller 293 may be adjusted toward and from the normal position of the roller 288. The bearing boss 269 is provided with the transverse apertures 269× to receive the slightly tapered end portion 295 of a wedge-bar 296 passing through the apertures 269× and entering the space between the rollers 288 and 293, its rearward end being pivotally connected by means of the pin 297 with an upwardly extending arm 298 fixed upon a rock-shaft 299 suitably journaled upon the standard 267 and provided on the side nearest the bearing boss 269 with a segmental weight-arm 300 carrying a lateral stud 301. The normal action of the weight 300 is to advance the wedge-bar between the rollers 288 and 293 so as to force the thrust-platen 276 downwardly in opposition to the action of the weights 286 upon the levers 281 285.

The standard 267 is constructed in practice with two parallel upright members tied together above the foot 266 by the plates 302 and 303, the former being provided with a bushing 304, and the latter with a suitable bearing in which is journaled the gate-pin bar 305 having intermediate the ends a transverse bearing boss 306 in which is confined by means of the cap 307 the transverse bearing sleeve 308 having bushings 309 at opposite ends in which is journaled the gate-pin supporting rock-shaft 310 carrying at its forward end the gate-pin carrier 311 having formed therein at right angles to each other and to the supporting shaft 310 sockets in which are secured by means of the clamp-screws 312 the shank 313 of the gate-pin or sprue-plug having the enlarged upper portion 314 and the reduced lower portion 315, and the shank of what may be termed the dummy gate-pin or sprue-plug having merely the enlargement 316 corresponding in shape and size with the enlargement 314 of the other gate-pin and fitted to the aperture 277 of the thrust-platen 276. The primary gate-pin 314 315 is designed for use in connection with the upper flask-section or cope and the secondary gate-pin 316 with the lower flask-section or drag.

Secured in the lower end of the gate-pin bar is the shank of a forked block 317 in which is journaled by means of the pin 318 the grooved pulley 319, and a similar forked block 320 is secured upon the lower face of the frame-plate 303 and has mounted therein upon the pin 321 the grooved pulley 322. A chain or cord 323 has one end attached to an eye 324 depending from the plate 303 and led around the lower side of the pulley 319 and over the pulley 322 and has its opposite end attached to an eye 325 upon the counterbalance weight 326 which acts through the pulley 319 to force the bar 305 into extreme upper position and with it the rock-shaft 310 and the gate-pins sustained thereby.

The flange 304× of the bearing bushing 304 is provided with lateral lugs 327 having threaded apertures entered by the reduced threaded ends of the upwardly extending thrust-rods 328 upon the shouldered upper ends of which are secured by means of the nuts 329 the oppositely apertured ends of the crossbar 330 which is provided with a central boss 331 apertured to receive the shouldered upper end portion 332 of a tubular plunger-rod 333 confined in position by means of the nut 334 applied to its threaded upper end. The lower portion of the plunger-rod 333 is fitted within a longitudinal aperture 335 formed in the upper portion of the gate-pin bar 305 affording a hydraulic cylinder of which the rod 333 constitutes the plunger. The upper portion of the bar 305 is provided with spaced collars 336 between which is confined the suitably apertured crosshead 337. Stop-sleeves 338 are fitted to and secured upon the thrust-rods 328 above the crosshead.

When water is admitted to the hydraulic cylinder afforded by the tubular upper end of the bar 305 through the axial aperture in the plunger-rod 333, the bar 305 is forced downwardly to carry the gate-pin through the thrust-platen aperture 277 into the flask, the downward motion being arrested by engagement of the crosshead 337 with the lugs 327 of the bushing 304, the weight 326 being raised by the descent of the bar 305. The relief of pressure in the hydraulic cylinder 335 permits the rise of the gate-pin bar 305 under the action of the weight 326 to initial position wherein the upper side of the crosshead engages the lower ends of the sleeves 338.

The crosshead 337 carries at one end the lateral stud 339 movable in a vertical path embracing the lateral stud 301 of the weighted arm 300. The stud 301 normally rests upon the stud 339 and when the latter descends with the crosshead in the gate-forming operation, the weighted arm 300 descends with it and forces the wedge-bar 296 forwardly so as to impose a downward thrust upon the roller 288 which is transmitted to the thrust-platen whereby the latter is caused to close up the clearance space normally provided between the lower face of the platen and the top of the laterally traveling flask, so that the upward movement of the press-platen 257 serves to lift the pattern and its supporting plate while the consequent upward thrust upon the flask is sustained directly by the thrust-platen 276 without displacement of the flask. As the gate-pin rises with the upward movement of its sustaining bar 305, the engagement of the stud 339 with the stud 301 causes the lifting of the weighted arm 300 and reverse movement of the rocking arm 298 whereby the wedge-bar 296 is withdrawn and the platen permitted to rise to initial position under the action of the weighted levers 281 285.

The rearward end of the bearing sleeve 308 is formed with a head 340 having a vertical undercut guideway 341 to the opposite walls of which are fitted the edges of a slide-plate 342 having the lateral tongues 343 and having secured in its lower end the depending stop-pin 344 and in its upper end the upwardly extending stop-pin 345 to whose upper extremity is fitted a socket in a cap 346 between the inner end of which and the extremity of the pin 345 is interposed a spring 347. The cap 346 is locked in position upon the upper end of the pin 345 by means of a screw 348 tapped into the latter and working in a lateral slot 349 in said cap.

The slide-plate 342 has upon its outer face a shouldered stud 350 upon which is locked by means of the washer 351 and pin 352 the hub 353 of a swinging lever 354 carrying upon its lower end the lateral stud 355 and normally maintained in parallel relation with the guide-plate by means of a spring 356 attached at one end to the grooved outer extremity 355ˣ of the stud 355 and at the opposite end to a pin 357 secured to the plate 342. The rock-shaft 310 has fixed upon its rearward end the cam-disk 358 cut out in the upper side adjacent the rearward face to form the inclined cam edges 359 terminating in the substantially diametrically arranged pockets 360, the parts 359 and 360 being adapted for engagement alternately by the stud 355 of the swinging lever 354.

The cam-disk 358 has near its forward face the peripheral notches 361 separated by a quadrant of the circumference and adapted for alternate engagement by the nose 362 at the lower end of a pawl-lever 363 whose upper end is provided with a transverse slot 364 entered by the fulcrum-pin 365 tapped into the head 340 of the sleeve 308. One edge of the pawl-lever 363 is provided with a lateral cam projection 366 adapted for engagement by the shank portion 350ˣ of the fulcrum-stud 350, while the opposite edge of said lever is slightly concaved to receive the convexly bent outer end portion 367 of a flat spring 368 having a foot portion or shank 369 with apertures 369ˣ entered by the fastening screws 370 tapped into the edge of the head 340 of the sleeve 308.

The mechanism just described constitutes what may be termed the gate-pin selecting device, the constituent parts of which, in the position of the supporting sleeve 308 intermediate extreme positions, assume the relations represented in Fig. 17. When the sustaining bar 305 descends, the pin 344 near the end of the latter's descent encounters the upper face of the frame-plate 303 and arrests the movement of the slide-plate 342 while the head 340 continues to descend, by means of which the cam-disk 358 is disengaged from the stud 355 and the swinging lever 354 is permitted to resume vertical position under the action of its spring 356, one of the cam edges 359 being in inclined position beneath the stud 355. In the ascent of the bar 305 to extreme elevated position, the engagement of the cushioned stop-pin 345 with the lower face of the frame member 302 causes the arrest of the upward movement of the slide-plate 342 with its swinging lever 354 while the block 340 constituting the head of the sleeve 308 continues to rise thereby carrying the cam-disk 358 bodily upward.

During this action, the stud 355 rides along the inclined cam edge 359 and into the adjacent pocket 360 by engagement with the bottom of which the cam-disk is tilted into a position of the parts at right angles to that represented in Fig. 17. During this relative movement of the slide-plate 342 and block 340, and just previous to the engagement of the stud 355 with the pocket 360, the cam projection 366 of the pawl-lever 363 engages the portion 350ˣ of the fulcrum-stud 350 whereby the nose 362 of the pawl-lever is retracted from the peripheral notch 361 of the cam-disk in opposition to its spring 368, thereby unlocking the cam-disk and permitting it to be turned through a quadrant by the subsequent action of the lever 354 and its stud 355, but the projection 366 being immediately disengaged from the stud 350ˣ, the nose 362 is caused to ride along the periphery of the cam-disk and to snap into the other notch 361 as the cam-disk is turned into the extreme position.

In the subsequent descent of the block 340 and in its final downward movement relative to the slide-plate 342, the engagement of the cam projection 366 of the pawl-lever with the stud 350ˣ merely causes the thrusting aside of the upper end of the pawl-lever upon its fulcrum-stud 365 without affecting the engagement of the nose 362 with the cam-disk, while the lever 354 is thrust aside by engagement of the stud 355 with the now lower cam edge 359 and returns to initial vertical position under the action of its spring 356 wherein the stud 355 assumes a position above the opposite and upwardly presented cam edge 359 preparatory to a succeeding operation.

In the action of the mechanism just described, the rock-shaft 310 receives a quarter turn in opposite directions for each two of the successive rising movements of the gate-pin bar 305, so that, as the cope and drag sections of the flask are applied to the flask-supporting members of the turret in alternate arrangement, the gate-pin 314 315 is caused to descend through the thrust-platen aperture 277 into the cope preparatory to one mold-compressing operation and the dummy gate-pin 316 is inserted in the thrust-platen aperture 277 to merely close the latter from escape of sand from the flask preparatory to the succeeding mold compressing action in connection with the drag.

Secured upon the bed-plate adjacent the bracket 52 is the foot 371 of the hydraulic valve casing 372 which is formed with the longitudinal supply and exhaust chambers 373 and 374, extending through the entire length of the casing and connected respectively with the supply and exhaust pipes 375 and 376 tapped into the bottom of the casing. Intermediate the supply and exhaust chambers the casing is formed with a series of independent distributing chambers 377 connected at the bottom with the pockets 378 each in communication with one of a series of distributing pipes screwed into bosses 379 upon the bottom of the casing.

The casing 372 is provided with a series of transverse slightly taper apertures each arranged centrally of one of the distributing chambers 377 in which is fitted a tubular valve seat 380 of corresponding taper form exteriorly but having a cylindrical interior face communicating with the chambers 373 374 and 377, respectively, by means of the annular series of apertures 381. The closed end of the tube 380 is provided with a threaded stud 382 to which is applied the nut 383 by means of which it is drawn inwardly to seat itself firmly within the transverse aperture of the casing. The reduced and threaded outer portion 384 of the tube has applied thereto the cap 385 having a cavity containing the packing 386 forming a stuffing box for the valve-rod 387 whose reduced inner end portion 388 is formed with a shoulder 389 against which is confined a piston-ring 390 by means of the nut 391 applied to the threaded extremity of the valve-rod. The reduced portion 388 of the valve-rod immediately in front of the piston-ring 390 affords a means of communication between the distributing chamber 377 and through the supply chamber 373 or exhaust chamber 374, and the endwise movement of the valve-rod therefore serves to control the connection of the distributing pipes with the supply and exhaust pipes.

As represented more particularly in Fig. 1, where they are shown partially in dotted lines, the distributing pipes 392, 393, 394, 395 and 396 are led from their respective distributing chambers 377 of the valve casing 372 to the closed ends of the ram-cylinders 206, 224, 255, 335 and 245, respectively.

The worm-wheel shaft 39 has fixed thereon above the bearing 44 the bevel-wheel 397 meshing with a similar bevel-wheel 398 upon the horizontal cam-shaft 399 mounted in suitable bearings 400 secured upon the bed-plate. The shaft 399 has fixed thereon the hubs of the spaced cam-wheels 401, 402, 403, 404 and 405 each provided in one face with a cam-groove 406 entered by a stud 407 upon a link-bar 408 having a forked extremity 409 embracing said shaft and pivotally connected at the opposite end by means of the transverse pin 410 with the forked extremity 411 of the valve-rod 387. The grooved faces of these cams are illustrated in Figs. 21 to 25 inclusive to show the forms of the several cam-grooves 406 and their relative positions at a given point in the rotation of the shaft, the cams 401, 402, 403, 404 and 405 actuating respectively, the valves controlling the operation of the sand-plate, sand-box, mold-press, tucker and gate-pins.

Figure 20:
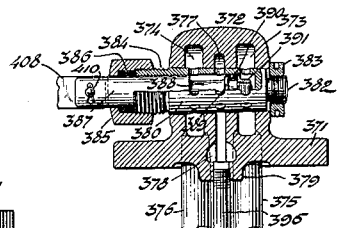

As the valve-actuating mechanism is positively connected with the turret-rotating mechanism, it is evident that the timing of the operation of the several hydraulic rams may be permanently adjusted once for all for causing their actuation in the required order and at the desired intervals between their periods of action, in the performance of the described flask-filling and mold-forming operations. As will be seen by reference to the detail views above referred to, the cam-grooves 406 of the cams 401, 402, 403 and 404 are such as to maintain the link-bars 408 normally in advance position wherein the valves controlling the sand-plate, sand-box, press and gate-pins connect the respective distributing pipes with the exhaust chamber 374, as represented in Fig. 20, while the tucker-controlling cam 405 is so formed as to maintain its respective valve in position to normally maintain communication between the corresponding distributing chamber 377 and the supply chamber 373 so as to sustain the weight of the disks 242 and hold the tucker in retracted position.

From the foregoing description, it will be observed that the flask-support carried by the turret moves in a plane substantially parallel with the operative face of the press-platen, and that the thrust-platen is so moved preparatory to a mold-pressing operation as to close the clearance space above the flask and to closely confine the latter between the thrust-platen and the flask-support. It will also be observed that the wedge-bar 296 in conjunction with the thrust rollers 288 and 293 constitutes a positively acting thrust-sustaining member which receives the upward impulse of the press-platen, transmitted through the contents of the flask and the intervening parts, thereby rendering the thrust-platen absolutely unyielding in performing its function, notwithstanding its hydraulic control through the action of the plunger 333 within the cylinder 335 of the gate-pin bar 305, the latter affording controlling means acting in opposition to the several weights 286, 300 and 326 to determine the movements and the relative timing of operation of the thrust-platen and gate-pin.

In the operation of the machine, as soon as the travel of the flask is arrested at the filling station, the water is admitted into the ram-cylinder 206 whereby the sand-plate and sand-box are forced into operative relation with the flask and the pressure thereafter relieved to permit the retraction of the sand-plate under the action of the return weights 220. Pressure in the tucker ram-cylinder is then relieved to permit the weights 242 to act in forcing the tucker downwardly through the sand-box to pack the sand around the pattern, after which the reëstablishment of the normal pressure in the tucker ram-cylinder causes the retraction of the tucker. The admission of water into the sand-box ram-cylinder now causes the retraction of the sand-box to initial position beneath the curb 170 of the sand-hopper, thereby carrying the superfluous sand still remaining in the sand-box over and into the cavities in the flask left by the tucker and striking off all sand remaining above the top of the flask and carrying it upon the retracted sand-plate for use in a succeeding flask-filling operation.

While the sand-filling, tucking and strike-off operations are being performed at one of the turret stations, a previously filled flask at another of the turret stations is being subjected to the gate-forming and mold-compressing operations. In the same period, just after the movement of the turret has ceased, water is admitted into the gate-pin ram cylinder for depression of the gate-pin bar 305 whereby the gate-pin moves downwardly through the aperture 277 of the thrust-platen 276, and the simultaneous advance of the wedge-bar 296 causes the thrust-platen to move downwardly into contact with the top of the flask. While the gate-pin and thrust-platen are in their lower positions, water is admitted to the press ram-cylinder 255 and the pattern carrier with its pattern-plate and pattern are forced upwardly sufficiently to bring the top of the pattern-plate flush with the bottom of the flask, after which the pressure is relieved successively in the press ram-cylinder and gate-pin ram-cylinder when the press-platen, the thrust platen and the gate-pin are retracted to initial position.

In the upward movement of the pattern-support the detaining arm is moved under the action of its weight 104 into vertical position wherein the pattern-support or carrier is caused to rest upon the roller 94. In the succeeding movement of the turret, the engagement of the weighted roller 104 with the cam-track 105 causes the gradual lowering of the pattern-support into initial lowered position in such manner as to minimize the suction between the pattern and the surrounding sand and thereby prevent injury to the mold-cavity formed thereby.

As fully set forth in my aforesaid application Serial No. 677,331, the turret-hub 10 is formed with the central cavity $10^x$ through which passes axially arranged tubular valve-stem 412 having in its otherwise closed lower end the nipple 413 connected with the compressed air supply pipe 414. Secured upon the externally threaded upper end of the valve-stem 412 is the hollow hub 415 of a conical valve-plug 416 formed with the divergently inclined apertures 417 in its upper face and having a single radial aperture 418 adapted for communication successively with a series of radial ports 419 of a conical valve-seat afforded in the center of the cap-plate 420 secured by screws 421 upon the top of the turret-hub 10. In each of the ports 419 is introduced one end of a radial air pipe 422 to whose opposite end is connected one end of a flexible hose 423 having its other end attached to the air pipe 116 leading to the inlet chamber of the cylinder 111 of the pattern vibrator or jarring device.

Fixed upon the externally threaded lower end portion of the tubular valve-stem 412 is the hub 424 of a crank-arm 425 pivotally connected by means of the pin 426 with one end of a link-bar 427 having its opposite end 428 forked to embrace the worm-wheel shaft 39 and having a roller-stud 429 entering a cam-groove 430 in the cam-wheel 431 which is fixed upon the worm-wheel shaft above the hub of the bevel-wheel 397. The relation of the parts is such that the link-bar 427 is actuated to turn the valve-stem 412 to open the air valve just about as the press-platen 257 commences to rise for a mold-compression operation, and continues until it is closed by the succeeding partial rotation of the turret to bring the flask to the adjacent delivery station, after which the valve-stem is turned backward to return the valve to initial position simultaneously with the movement of the turret in performing the first part of its succeeding advance, and the valve remains in such position in readiness for a succeeding actuation for admission of air into the delivery pipe 422.

Secured upon the top of the cap-plate 420 by means of screws 432 is a conical valve-plug 433 having upwardly extending externally threaded nipple 434 and provided with a series of radial ports 435 corresponding in number and arrangement with the flask-supports of the turret. Fitted upon the conical exterior of the valve-plug and affording a movable seat therefor is the collar 436 provided with a series of radial ports 437 corresponding in number and spacing with those of the valve-plug 433, the collar being confined in position by means of a cap 438 having an internally threaded aperture applied to the nipple 434 and secured in position thereon by means of the lock-nut 439. Fitted upon and fixed to the exterior of the collar 436 is the hub 440 of a tubular socketed arm 441 having its central aperture 442 in communication with the chamber 443 in the hub surrounding the ports 437 of the collar 436.

The socket of the arm 441 has secured therein one end of the blow-out pipe 444 closed at the other end by a cap 445 and having projecting from its lower side a series of spaced nozzles 446 adapted to direct jets of air downwardly upon the pattern to disengage any adhering particles of sand therefrom after the removal of the flask. Projecting from the hub 440 at the side thereof opposite the arm 441 is a second arm 447 formed with a counter-balance weight 448 provided upon its upper face with a stud 449 adapted for engagement with a stop-pin 450 mounted upon the inner cross-member 168 of the sand-hopper supporting frame. The hub 440 is further provided with a lateral pin 451 having attached thereto one end of a spring 452 whose other end is connected with a stud 453 also depending from the sand-hopper frame-member 168, whereby the hub is maintained yieldingly in initial position wherein the stud 449 rests in contact with the stop-pin 450.

The ports 435 and 437 of the valve-plug 433 and its rotary seat 436 are normally out of register during the intervals of rest of the turret, so that the air supply of the blow-off pipe 444 is normally interrupted, but in each partial rotation of the turret to carry the flask from one station to the next, the movement of the valve-plug 433 with the turret hub causes the successive opening and closing of the blow-off air valve so as to produce jets of air directed upon the pattern in its movement from the flask-removal station to the adjacent station.

In the normal operation of the machine, ample time is provided in the period of rest of the turret for removal of the flask at the station next that at which the compression takes place, but in case of delay occasioned by difficulty in disengaging the flask from its support, the flask could still be removed without danger to the attendant in the succeeding advance of the turret, owing to the yielding support of the blow-off pipe 444 under the action of the spring 452, so that the engagement of the attendant's arm with such pipe will cause it to be temporarily thrust aside to be returned to initial position after the removal of the flask.

As herein shown, the nipple 434 is provided with an axial oil duct 454 having an internally threaded socket at the upper end in which is secured the oil cup 455 which supplies oil to the valve-plug 416 by means of the tube 456 whose lower end is seated upon the conical upper face of the valve-plug and which is prevented from turning therewith by means of the radial pin 457 extending from the same into a suitable aperture in the stationary valve-plug 433, which is itself provided with oil from an annular cavity 458 supplied through an oil hole 459 closed by the screw-plug 460.

As shown in Fig. 2 the bearing of the valve-stem 412 in the lower portion of the turret hub is oiled by means of the bent pipe 461 extending from the cap plate 420 downwardly through the central cavity 10$^x$ of the turret hub 10. As a convenient means of lubricating the conical bearing of the turret hub 10 in the bushing 8, the inclined oil pipe 462 is secured in the disk 11 of the turret and is normally closed by means of the cap 463.

While the specific construction and relation of the component members of the several parts of the apparatus herein shown and described are deemed preferable, it is evident that they are susceptible of very material modification in various respects without departure from the scope of the present invention which has special relation to the general construction and arrangement of parts and principles of operation thereof rather than to the mere details of construction and arrangement of such parts of the present improvement in its embodiment herein disclosed.

Having thus set forth the nature of the invention, what I claim herein is:—

1. In a molding machine, the combination with a thrust-platen provided with a gate-pin aperture, a press-platen movable toward and from the same, and press-platen actuating means, of a gate-pin movable toward and from the press-platen through the aperture in said thrust-platen, and automatically acting means actuated independently of the press-platen actuating means for operating said gate-pin.

2. In a molding machine, the combination with a press-platen, actuating means therefor, and a thrust-platen provided with a gate-pin aperture and mounted for movement toward and from the press-platen, of a gate-pin sustained independently of the thrust-platen and movable through the aperture in the thrust-platen toward and from the press-platen, and means for imparting to the thrust-platen and gate-pin differential operative movements toward and from the press-platen.

3. In a molding machine, the combination with a press-platen, actuating means therefor, and a thrust-platen provided with a gate-pin aperture and mounted for movement toward and from the press-platen, of a gate-pin sustained independently of the thrust-platen and movable through the aperture in the thrust-platen toward and from the press-platen, the gate-pin and thrust-platen being provided the one with operative means movable relatively to the press-platen and the other with an operative connection with said operating means.

4. In a molding machine, the combination with a press-platen, actuating means therefor, and a thrust-platen provided with a gate-pin aperture and mounted for movement toward and from the press-platen, of a gate-pin sustained independently of the thrust-platen and movable through the aperture in the thrust-platen toward and from the press-platen, gate-pin operating means, and an operative connection between the gate-pin operating means, and the thrust-platen for imparting operative movements to the latter.

5. In a molding machine, the combination with a thrust-platen provided with a gate-pin aperture, a press-platen movable toward and from the same, and press-platen actuating means, of a plurality of gate-pins movable toward and from the press-platen and adapted to enter successively the aperture of said thrust-platen, gate-pin selecting means for controlling the presentation of the gate-pins to said gate-pin aperture, and gate-pin reciprocating means.

6. In a molding machine, the combination with a thrust-platen provided with a gate-pin aperture, a press-platen movable toward and from the same, and press-platen actuating means, of a plurality of gate-pins movable toward and from the press-platen and adapted to enter successively the aperture of said thrust-platen, automatically acting gate-pin selecting means for controlling the presentation of the gate-pins to said gate-pin aperture, and gate-pin reciprocating means.

7. In a molding machine, the combination with a thrust-platen provided with a gate-pin aperture, a press-platen movable toward and from the same, and press-platen actuating means, of a plurality of gate-pins mounted upon a carrier movable toward and from the press-platen and adapted to enter successively the aperture of said thrust-platen, actuating means for reciprocating said carrier, and gate-pin selecting means actuated by the retractive movement of the carrier whereby different gate-pins are directed toward the gate-pin aperture preparatory to successive actuations of said carrier.

8. In a molding machine, the combination with a thrust-platen provided with a gate-pin aperture, a press-platen movable toward and from the same, and press-platen actuating means, of a plurality of gate-pins, a reciprocating bar having a path of movement substantially parallel with that of the press-platen, a gate-pin carrying shaft journaled upon and transversely of said bar and sustaining said gate-pins in angular arrangement with each other, means for imparting to said shaft a partial rotation preparatory to each reciprocation of said bar, and actuating means for said bar.

9. In a molding machine, the combination with the press-platen, operating means therefor, a flask, a flask-support movable into and out of register with said press-platen, and actuating means for said flask-support, of a thrust-platen, means for yieldingly sustaining said thrust-platen, and means adapted to intermittently impart a slight movement to the thrust-platen in opposition to its sustaining means and thereafter to rigidly hold said thrust-platen above the flask during the operation of the press-platen.

10. In a molding machine, the combination with the press-platen, actuating means therefor, a flask-support movable into and out of register with said press-platen, and actuating means for said flask-support, of a thrust-platen sustained in alinement with the press-platen and normally retracted from contact relation with the flask, means for advancing the thrust platen toward the flask, and means independent thereof for retracting said platen to initial position.

11. In a molding machine, the combination with the press-platen, actuating means therefor, a flask-support movable into and out of register with said press-platen, and actuating means for said flask-support, of a thrust-platen sustained in alinement with the press-platen and normally retracted from contact relation with the flask, weight-actuated means for advancing the thrust-platen toward the flask, and means independent thereof for retracting said platen to initial position.

12. In a molding machine, the combination with the press-platen, actuating means therefor, a flask-support movable into and out of register with said press-platen, and actuating means for said flask-support, of a thrust-platen sustained in alinement with the press-platen and normally retracted from contact relation with the flask, an endwise movable plunger-bar carrying the thrust-platen, a bearing therefor, spaced shoulders upon said plunger and its bearing, a transversely movable wedge-bar disposed intermediate and in operative engagement with said shoulders, means for actuating said wedge-bar to advance the platen toward the flask, and means independent thereof for retracting the platen.

13. In a molding machine, the combination with the press-platen, actuating means therefor, a flask-support movable into and out of register with said press-platen, and actuating means for said flask-support, of a thrust-platen provided with a gate-pin aperture and sustained in alinement with the press-platen and normally retracted from contact relation with the flask, a gate-pin sustained in register with said aperture, reciprocating means for the gate-pin, and means controlled by the operative movements of the gate-pin for advancing and retracting the thrust-platen into and out of operative relation with the flask while in operative relation with the press-plunger.

14. In a molding machine, the combination with the press-platen, actuating means therefor, a flask-support movable into and out of register with said press-platen, and actuating means for said flask-support, of a thrust-platen provided with a gate-pin aperture and sustained in alinement with the press-platen and normally retracted from contact relation with the flask, a gate-pin sustained in register with said aperture, reciprocating means for the gate-pin, weight-actuated means for retracting and yieldingly maintaining in retracted position the thrust-platen, weight-actuated means for advancing the thrust-platen in opposition to its retracting means, and controlling devices connected with the gate-pin actuating means for governing the operative movements of the thrust-platen advancing means.

15. In a molding machine, the combination with a thrust-platen provided with a gate-pin aperture, a press-platen movable toward and from the same, and press-platen actuating means, of a gate-pin adapted to enter the aperture of said thrust-platen, a reciprocating carrier upon which said gate-pin is movable into and out of register with the gate-pin aperture, and means for closing said aperture when the gate-pin is retracted from register therewith.

16. In a molding machine, the combination with a thrust-platen provided with a gate-pin aperture, a press-platen movable toward and from the same, and press-platen actuating means, of a plurality of gate-pins movable toward and from the press-platen and adapted to enter successively the aperture of said thrust-platen, gate-pin selecting means for controlling the presentation of the gate-pins to said gate-pin aperture, and gate-pin reciprocating means.

17. In a molding machine, the combination with the press-platen, a flask-support movable into and out of register with said press-platen, and actuating means for said flask support, of a thrust-platen, means for yieldingly sustaining said thrust-platen, means for intermittently moving the press-platen toward the thrust-platen, and means independent of the sustaining means for the thrust-platen and adapted to hold the thrust-platen motionless during the action of the press-platen.

In testimony whereof, I have signed my name to this specification, in the presence of two subscribing witnesses.

ALEXANDER McCARTE.

Witnesses:
A. J. MILLER,
H. A. KORNEMANN, Jr.